United States Patent
Popper et al.

(10) Patent No.: US 6,238,720 B1
(45) Date of Patent: May 29, 2001

(54) GELLED EMULSION PRODUCTS CONTAINING CHITOSAN

(75) Inventors: Gerhard Popper, St. Joseph, MO (US); Susanne Ekstedt, Billdal (SE); Pernilla Walkenström; Anne-Marie Hermansson, both of Gothenburg (SE)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/380,121

(22) PCT Filed: Feb. 26, 1998

(86) PCT No.: PCT/EP98/01281

§ 371 Date: Nov. 10, 1999

§ 102(e) Date: Nov. 10, 1999

(87) PCT Pub. No.: WO98/37775

PCT Pub. Date: Sep. 3, 1998

(30) Foreign Application Priority Data

Feb. 28, 1997 (EP) .................................................. 97200597

(51) Int. Cl.⁷ ................................ A23L 1/31; A23L 1/053
(52) U.S. Cl. ...................... 426/574; 426/601; 426/654; 426/656; 426/658; 426/807
(58) Field of Search ................................ 426/574, 573, 426/654, 656, 658, 601, 807

(56) References Cited

U.S. PATENT DOCUMENTS

| | | | |
|---|---|---|---|
| 4,169,162 | * 9/1979 | Appleman | 426/335 |
| 4,781,939 | 11/1988 | Martin et al. | 426/646 |
| 5,098,733 | * 3/1992 | Kyogoku et al. | 426/573 |
| 5,132,137 | 7/1992 | Reimann et al. | 426/513 |
| 5,549,919 | * 8/1996 | Ueno et al. | 426/335 |

FOREIGN PATENT DOCUMENTS

| | | |
|---|---|---|
| 0018153 | 10/1980 | (EP) . |
| 63-287447 | 11/1988 | (JP) . |
| 3-019649 | 1/1991 | (JP) . |
| 3-058771 | 3/1991 | (JP) . |
| 3-143364 | 6/1991 | (JP) . |
| 4-053469 | 2/1992 | (JP) . |
| WO 96/00056 | 1/1996 | (WO) . |
| 96/13984 | * 5/1996 | (WO) . |

OTHER PUBLICATIONS

Journal of Food Science 47(2), 1982, 593–595, "Functional Properties of Chitin and Chitosan," Dietrich Knorr.

* cited by examiner

Primary Examiner—Chhaya D. Sayala
(74) Attorney, Agent, or Firm—Bell, Boyd & Lloyd

(57) ABSTRACT

A sterilized, gelled emulsion product which contains protein, lipid, carbohydrate and a binder. The binder is made up of chitosan or a mixture of chitosan and a polyphosphate. The emulsion product is less susceptible to cook out of fats and starch during sterilization and has a firm, relatively elastic texture. The sterilized, gelled emulsion product may be provided in the form of a chunks-in-liquid pet food.

13 Claims, No Drawings

GELLED EMULSION PRODUCTS CONTAINING CHITOSAN

This invention relates to a gelled and sterilized emulsion product; for example meat or fish analogues. The invention also relates to a process for preparing the gelled emulsion product and to the use of chitosan as a binder for the gelled emulsion products.

Gelled emulsion products are commonly used as foodstuffs. This is especially the case in the pet food industry where they are used as meat or fish analogues. However they are also used in other fields such as the sausage field. In the pet food industry, these products are usually provided in cans and in one of two forms; loaf type products and chunk-type products.

The loaf type products are usually prepared by comminuting meat or fish material and mixing the material with other protein sources and fats, if necessary, and water, salt, spices, curing agents, gelling agents to provide a batter. The batter is then heated. The heated batter is then filled into cans to form, after retorting and cooling, a meat or fish loaf.

The chunk-type products may be produced in a similar manner; the primary difference being the selection of specific gelling agents to provide a harder, tougher structure. For example, as described in European patent application 001 8153, a gelling system made up of a carrageenan and a glucomannan may be used to prepare chunks-type products. The components making up product are mixed together, heated to above 100° C. to form a gel, filled into cans, and then sterilized at 130° C. for 50 to 60 minutes.

Alternatively, the chunk-type products may be produced in the form of formulated emulsions which closely simulate the appearance of meat or fish. One example of a process for producing these formulated emulsions is described in U.S. Pat. No. 4,781,939. Here, a viscous emulsion is prepared from meat, proteinaceous materials (for example wheat gluten and soy flour), vitamins, minerals and the like. The viscous emulsion is then run through a high-speed emulsion mill in which the emulsion is rapidly heated. The emulsion leaving the emulsion mill is then allowed to coagulate to form a solid emulsion product. This solid emulsion product is then cut into chunks. A similar process is described in U.S. Pat. No. 5,132,137.

In all cases, once the emulsion products have been filled into cans, the cans are subjected to retorting to sterilize the emulsion products. The retorting operation is severe with temperatures up to 130° C. being reached for relatively long periods of time. This may result in release of fats and starch from the emulsion product; a phenomenon known as "cook out". The phenomenon is particularly prevalent in emulsion products with a high water content. If cook out occurs, the appearance of the product is adversely affected; often to a significant extent. This may greatly reduce consumer acceptability.

Therefore, it is an object of this invention to provide an emulsion product with reduced susceptibility to cook out. Accordingly, in one aspect, this invention provides a sterilized, gelled emulsion product containing protein, lipid, carbohydrate and a binder; the binder comprising chitosan. Preferably the gelled emulsion product is provided in the form of chunks in a liquid. The liquid may be a sauce or gravy.

Surprisingly, gelled emulsion products in which the binder comprises chitosan are able to withstand normal sterilization procedures with limited cook out of lipids and starch. This remains the case even for products with relatively high concentrations of lipids. Further, the gelled emulsion products have improved texture in that they exhibit improved firmness and have good elasticity.

Preferably the binder further comprises a food grade polyphosphate; for example a sodium diphosphate.

In another aspect, this invention provides a process for producing a sterilized, gelled emulsion product, the process comprising:

forming an emulsion containing protein, lipid, and carbohydrate;

adding a binder, which includes chitosan, to the emulsion;

heating the emulsion to above about 65° C. to cause the emulsion to gel;

forming the gelled emulsion into chunks;

filling the chunks and a liquid into containers; and sterilizing the containers at above about 120° C. to provide the sterilized, gelled emulsion product.

In further aspect, this invention provides the use of chitosan and a food grade polyphosphate as a binder in the preparation of a sterilized, gelled emulsion product.

Embodiments of the invention are now described, by way of example only. The invention provides a sterilized, gelled emulsion product that contains protein, lipid, carbohydrate and a binder.

The protein may be provided in the form of a meat material, animal or diary proteins, and vegetable proteins, or mixtures of these. Any suitable type of meat material may be used, for example, muscular or skeletal meat, meat by-products such as hearts, liver, kidneys, tongue, or a mixture of meat and meat by-products. Further, the material may be obtained from any suitable source such as from livestock, poultry, and fish. Also, the meat material may be in the form of meat meals such as poultry meal, fish meal, red meat meal and mixtures thereof. Suitable animal or dairy proteins which may be used include egg proteins, gelatin, whey, and casein, or mixtures of these. Suitable vegetable proteins which may be used include wheat gluten, soy flour, soy protein concentrates, soy protein isolates, pea protein isolates, etc, or mixtures of these. The exact choice of protein used will depend upon factors such as availability, cost and palatability. Typically, the protein comprises about 5% to about 15% by weight of the gelled emulsion product.

The lipid may be provided in the form of suitable animal or vegetable fats and oils, or both. If the protein is provided in the form of a meat material, the meat material may well provide the desired amount of lipids and hence addition of further lipid may not be necessary. Suitable examples of animal fats are tallow, chicken fats, pork fats, beef fats, and the like. Suitable examples of vegetable fats and oils are hydrogenated palm oil, corn oil, sunflower oil, rapeseed oil, and the like.

Typically the emulsion product contains a maximum lipid level of about 25% by weight. Conveniently, the amount of lipid in the emulsion is in the range of about 2% to 15% by weight; more preferably about 5% to about 12% by weight.

The carbohydrate is preferably provided in the form of a starch or flour. Suitable carbohydrate sources are wheat starch, potato starch, corn starch, wheat flour, corn flour, oat flour, rye flour, rice flour, and the like. Sugars may also be added. Typically, the carbohydrate, in the form of starch or flour, comprises about 3% to about 15% by weight of the gelled emulsion product.

Additional ingredients such as salts, spices, seasonings, flavoring agents, minerals, and the like may also be included in the emulsion product. The amount of additional ingredients used is preferably such that they make up about 0.5% to about 5% by weight of the emulsion product.

The binder includes chitosan. The chitosan preferably comprises about 0.05% to about 2% by weight of the emulsion product; more preferably about 0.1% to about 1% by weight. Further, in addition to the chitosan, the binding agent preferably includes a food grade polyphosphate; for example a diphosphate such as $Na_4P_2O_7$. The polyphosphate preferably comprises about 0.05% to about 2% by weight of the emulsion product; more preferably about 0.1% to about 1% by weight.

The emulsion product may be prepared by emulsifying the protein, carbohydrates and lipids to provide a primary emulsion. The additional ingredients such as salts, spices, seasonings, flavoring agents, minerals, and the like may be added at this time. Water may also be included in the primary emulsion to provide from about 50% to about 90% by weight of the primary emulsion. If sufficient moisture is present in the protein, especially if the protein is provided as a meat material, water need not be added. A higher speed emulsifier or homogeniser is particularly suitable for preparing the primary emulsion.

If a polyphosphate is used in the binder, the polyphosphate is then added to the primary emulsion and allowed to react with the protein. The reaction time may be varied as desired but may be in the range of about 2 minutes to about 24 hours.

The chitosan is then added to the primary emulsion; preferably in solution. The primary emulsion is then subjected to further mixing or emulsification. The primary emulsion is then heated to a temperature above about 65° C.; for example in a mixer-cooker. Steam may be injected into the primary emulsion if desired.

If it is desired to produce chunks, the heated emulsion may then be extruded, cooled and cut into chunks. Alternatively, formulated emulsion chunks may be produced by rapidly heating the primary emulsion in an emulsion mill as described in U.S. Pat. Nos. 4,781,939 and 5,132,137; the disclosures of which are incorporated by reference. The chunks may then be mixed with a suitable liquid, such as a gravy or jelly and filled into cans or other containers. The gravy or sauce may be produced from water, starch, suitable flavoring agents and optionally gums.

However, if it desired to produce a loaf type product, the heated emulsion may be filled directly into cans or other containers. The cans or other containers are then sealed and sterilized. Sterilization usually takes place at a temperature above about 120° C. and for a period of at least about 15 minutes.

The gelled emulsion product obtained undergoes much less cook out of fats and starches giving a product with an excellent appearance. Further, the gelled emulsion product has a firm, relatively elastic texture.

Specific examples are now described for further illustration.

EXAMPLE 1

Frozen pork shoulder and foreleg is comminuted and emulsified with pork back fat in a homogenizer. Carbohydrate, in the form of wheat starch, and salt are added and the mixture mixed at low speed. Water is added and the mixture emulsified at high speed.

The mixture is divided into two parts. Chitosan (Seacure CL3 13 obtained from Pronova A/S of Norway) is dissolved in water to provide a 2% to 3% by weight solution. The chitosan has a percentage deacetylation of 83% and pH of 4.5. The chitosan solution is added to one part of the mixture; the other part forming a control. The mixtures are heated treated at 78° C. for 30 minutes and then allowed to cool to form gelled emulsion products. The components used to produce each gelled emulsion product are as follows:

| Product | Meat % | Fat % | Starch % | Chitosan % | Salt % | Added Water % |
|---|---|---|---|---|---|---|
| 1 | 35 | 12 | 10 | 0.5 | 2 | 40.5 |
| Control A | 35 | 12 | 10 | — | 2 | 41 |

The gelled emulsion products are cut into chunks and filled into cans with water. The cans are sealed and sterilized at 121° C. for 20 minutes. The cans are then allowed to cool.

The cans are opened and the contents visually inspected. The chunks of product 1 are well-formed chunks with well defined edges. Little or no cook out of fat or starch is noticeable. The chunks of control product A have less well defined edges. Cook out of fat and starch is readily noticeable.

A sample chunk is taken from each product and cut into a piece of 15 mm by 15 mm by 25 mm. The fracture properties of each piece is then analyzed using a Instron 1122 machine at a constant crosshead speed of 20 mm per minute. The stress and strain values obtained are as follows:

| Product | Stress at fracture (kPa) | Strain at fracture |
|---|---|---|
| 1 | 3.5 | 0.115 |
| Control A | 2.4 | 0.105 |

Product 1 has a higher stress value than the control product indicating that it is firmer. Further, product 1 has a higher strain value than the control product indicating that it is more elastic.

A further sample chunk is taken from each product and is frozen using liquid nitrogen. Sections of 20 $\mu$m are made from each sample chunk. The sections are mounted on glass slides and stored until stained. Half of the sections are stained using a solution of Aniline blue and Orange G to colour collagen and gelatin blue and myofibrillar protein yellow. Starches and fats are uncolored. The other half of the sections are stained using an iodine solution to colour amylose blue, amylopectin purple and proteins yellow. Fats are uncolored. A Nikon FXA microscope is used to examine the sections and a differential interference contrast is used to increase the contrast in protein stains. The structure of all products are similar except that the samples of product 1 indicate interaction between the chitosan and the proteins and amylose.

EXAMPLE 2

The process of example 1 is repeated except that tvo different mixtures with different meat, fat and water contents are prepared. Also, prior to addition of the chitosan solution, a polyphosphate ($P_2O_7$) is added to each mixture. The components used to produce each gelled emulsion product are as follows:

| Product | Meat % | Fat % | Starch % | Chitosan % | Salt % | $P_2O_5$ | Added Water % |
|---|---|---|---|---|---|---|---|
| 2 | 35 | 12 | 10 | 0.5 | 2 | 0.5 | 40 |
| 3 | 29 | 10 | 8.3 | 0.4 | 1.7 | 0.4 | 50.2 |
| Control B | 35 | 12 | 10 | — | 2 | 0.5 | 40.5 |
| Control C | 29 | 10 | 8.3 | — | 1.7 | 0.4 | 50.6 |

The cans are opened and the contents visually inspected. The chunks of products 2 and 3 are well-formed with well defined, clear edges. Little or no cook out of fat or starch is noticeable. The chunks of control product B and C have less well defined edges. Cook out of fat and starch is readily noticeable.

A sample chunk is taken from each product and analyzed using a Instron 1122 machine at a constant crosshead speed of 20 mm per minute. The stress and strain values obtained are as follows:

| Product | Stress at fracture (kPa) | Strain at fracture |
|---|---|---|
| 2 | 6 | 0.12 |
| 3 | 3.5 | 0.137 |
| Control B | 3.8 | 0.150 |
| Control C | 2.8 | 0.142 |

The control product C was too weak and watery to measure the stress and strain. Products 2 and 3 have a higher stress value than the control product of corresponding water content indicating that they are firmer. Further, the control products have a higher strain value than the product 2 and indicating that the control products are more elastic. It is also noted that product 2 has higher stress and strain values than product 1 of example 1, indicating a synergistic effect between the chitosan and the polyphosphate.

A further sample chunk is taken from each product and the structure analyzed as described in example 1. The structure of control products B and C is made up of fragments of muscle fibers and a network of muscle proteins surrounding starch granules and fat. The structure of products 2 and 3 is very different and is made up of a protein network reinforced by chitosan surrounding starch granules and fat. The chitosan appears to cross-link to the polyphosphates which are integrated into the protein structure.

EXAMPLE 3

The process of example 1 is repeated except that cod fillet is used instead of meat, vegetable oil instead of pork fat, and potato starch instead of wheat starch. Further, two different mixtures with different fish, fat and water contents are prepared. The components used to produce each gelled emulsion product are as follows:

| Product | Fish % | Oil % | Starch % | Chitosan % | Salt % | Added Water % |
|---|---|---|---|---|---|---|
| 4 | 50 | 4 | 10 | 0.5 | 2 | 33.5 |
| 5 | 45 | 3.6 | 9 | 0.45 | 1.8 | 40.15 |

-continued

| Product | Fish % | Oil % | Starch % | Chitosan % | Salt % | Added Water % |
|---|---|---|---|---|---|---|
| Control D | 50 | 4 | 10 | — | 2 | 34 |
| Control E | 45 | 3.6 | 9 | — | 1.8 | 40.6 |

The gelled emulsion products are cut into chunks and filled into cans with water. The cans are sealed and sterilized at 121° C. for 20 minutes. The cans are then allowed to cool.

The cans are opened and the contents visually inspected. The chunks of products 4 and 5 are well-formed with well defined edges. Little or no cook out of fat or starch is noticeable. The chunks of control product D and E have less well defined edges. Cook out of fat and starch is readily noticeable.

A sample chunk is taken from each product and analyzed using a Instron 1122 machine at a constant crosshead speed of 20 mm per minute. The stress and strain values obtained are as follows:

| Product | Stress at fracture (kPa) | Strain at fracture |
|---|---|---|
| 4 | 8.4 | 0.09 |
| 5 | 5.8 | 0.09 |
| Control D | 6.1 | 0.115 |
| Control E | 5.2 | 0.105 |

Products 4 and 5 have a higher stress value than the control product of corresponding water content indicating that they are firmer. However, products 4 and 5 have a lower strain value than the corresponding control product indicating that they are less elastic.

What is clamed is:

1. A sterilized, gelled emulsion product including protein, lipid, carbohydrate and a binder; the binder comprising chitosan and a food grade polyphosphate.

2. A sterilized, pet food product comprising chunks of a gelled emulsion product in a liquid, the gelled emulsion product comprising protein, lipid, carbohydrate and chitosan as a binder.

3. A sterilized, gelled emulsion product according to claim 2 which comprises 5% to 15% by weight of protein; 2% to 15% by weight of lipid; and 3% to 15% by weight of carbohydrate.

4. A sterilized, gelled emulsion product according to claim 2 further comprising a food grade polyphosphate as a binder.

5. A sterilized, gelled emulsion product according to claim 4 in which the food grade polyphosphate is sodium diphosphate.

6. A sterilized, gelled emulsion product according to claim 5 which comprises 0.05% to 2% by weight of chitosan and 0.05% to 2% by weight of sodium diphosphate.

7. A sterilized, gelled emulsion product according to claim 1 in which the food grade polyphosphate is sodium diphosphate.

8. A sterilized, gelled emulsion product according to claim 7 which comprises 0.05% to 2% by weight of chitosan and 0.05% to 2% by weight of sodium diphosphate.

9. A sterilized, gelled emulsion product according to claim 1 which comprises 5% to 15% by weight of protein; 2% to 15% by weight of lipid; and 3% to 15% by weight of carbohydrate.

10. A process for producing a sterilized, pet food product, the process comprising:
 forming an emulsion containing protein, lipid, and carbohydrate adding a binder, which includes chitosan, to the emulsion;
 heating the emulsion to above about 65° C. to cause the emulsion to gel;
 forming the gelled emulsion into chunks;
 filling the chunks and a liquid into containers; and
 sterilizing the containers at above about 120° C. to provide the sterilized, pet food product.

11. A process according to claim 10 further comprising, prior the addition of the chitosan, adding a polyphosphate to the emulsion and causing the polyphosphate to react with the protein.

12. A process according to claim 11 in which the food grade polyphosphate is sodium diphosphate.

13. A process for preparing a sterilized, pet food product, the process comprising the steps of:
 providing a chitosan binder;
 forming an emulsion containing protein, lipid, and carbohydrate;
 adding chitosan to the emulsion; and adding a food grade polyphosphate to the emulsion.

* * * * *